United States Patent [19]
Chramiec et al.

[11] 3,786,405
[45] Jan. 15, 1974

[54] SYSTEM FOR LOW-FREQUENCY TRANSMISSION OF RADIANT ENERGY
[75] Inventors: Mark A. Chramiec, Newport, R.I.; William L. Konrad, Niantic, Conn.
[73] Assignee: Raytheon Company, Lexington, Mass.
[22] Filed: Nov. 8, 1972
[21] Appl. No.: 304,884

Related U.S. Application Data
[62] Division of Ser. No. 111,218, Feb. 1, 1971, abandoned.

[52] U.S. Cl.......... 340/3 R, 340/3 FM, 343/100 CL
[51] Int. Cl............................................. G01s 9/68
[58] Field of Search................. 340/1 R, 3 FM, 3 R, 340/5 R; 343/100 CL; 181/0.5 R, 0.5 J, 0.5 AG, 0.5 A

[56] References Cited
UNITED STATES PATENTS
3,510,833  5/1970  Turner............................ 340/5 R X
3,613,069  10/1971  Cary, Jr. ............................. 340/3 R Primary Examiner—Richard A. Farley
Attorney—Milton D. Bartlett et al.

[57] ABSTRACT

A communication system utilizing a highly directive low-frequency transmission of radiant energy which is generated by directing a beam of radiant energy at a first high frequency and at a second high frequency into a nonlinear transmission medium. By virtue of an interaction in the nonlinear medium between the energies at the first and the second high frequencies, a low frequency beam of radiation is produced having a directivity pattern comparable to that of the energy radiated at the high frequencies. The system is particularly useful for sonic examination of the seabed for sub-oceanic strata and buried objects such as pipes, in which case a receiving hydrophone and display are utilized to plot a graphical display of echoes reflected from the strata.

26 Claims, 5 Drawing Figures

PATENTED JAN 15 1974 3,786,405

SYSTEM FOR LOW-FREQUENCY TRANSMISSION OF RADIANT ENERGY

RELATED APPLICATION

This application is a divisional of a prior pending application, Ser. No. 111,218, filed Feb. 1, 1971 and now abandoned.

BACKGROUND OF THE INVENTION

In the past, examination of the seabed for sub-oceanic strata and for objects buried in the sea floor has been particularly difficult due to the fact that high energy sonic radiations are required to provide high resolution narrow beam patterns. However, these high frequencies either tend to reflect off the first interface between the ocean waters and sub-oceanic strata such as sand and gravel at the ocean bottom, or are rapidly attenuated as they propagate through such strata. Consequently, little if any high resolution data can thereby be provided relative to sub-bottom strata or buried objects. By way of contrast, low frequency sonic radiations readily penetrate sub-bottom strata with sufficient remaining energy to reflect off submerged objects such as buried pipes. However, a problem arises in the use of such low frequency sonic radiations in that generally it is impractical to provide a transducer of sufficient physical size to generate a beam of such radiation having a sufficiently narrow beam width to permit high resolution examination of the ocean bottom.

SUMMARY OF THE INVENTION

In accordance with the invention there is provided a means for generating a narrow beam of low frequency radiation by utilization of a relatively small sized high frequency transducer, or radiating antenna. The transducer is excited with energy at a first and at a second high frequency. The transducer being linear transmits two nearly identically dimensioned beams of high frequency energy, one of these beams having a directivity pattern associated with the wavelength of energy at the first high frequency and the second beam having a directivity pattern associated with the wavelength of radiation at the second high frequency. The two beams propagate through a nonlinear media, in this case two beams of sonic energy traversing a region of the ocean waters, and interact to generate energy which radiates outwardly from the interaction region at a frequency equal to the difference of the first and the second high frequencies. It is believed that the interaction region, being many times larger than the transducer, is able to form a narrow beam of radiation due to its relatively large size compared to a wavelength of the low frequency radiation. Thus, there is produced a low frequency narrow beam of sonic radiation which penetrates the ocean bottom and is thus able to extract high resolution data of sub-bottom layers and buried objects against which the sound impinges. Reflections from these objects are received by a suitable means such as a hydrophone and are presented on a display similar to that utilized in sonar systems for a graphical portrayal of the ocean bottom and objects submerged therein.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
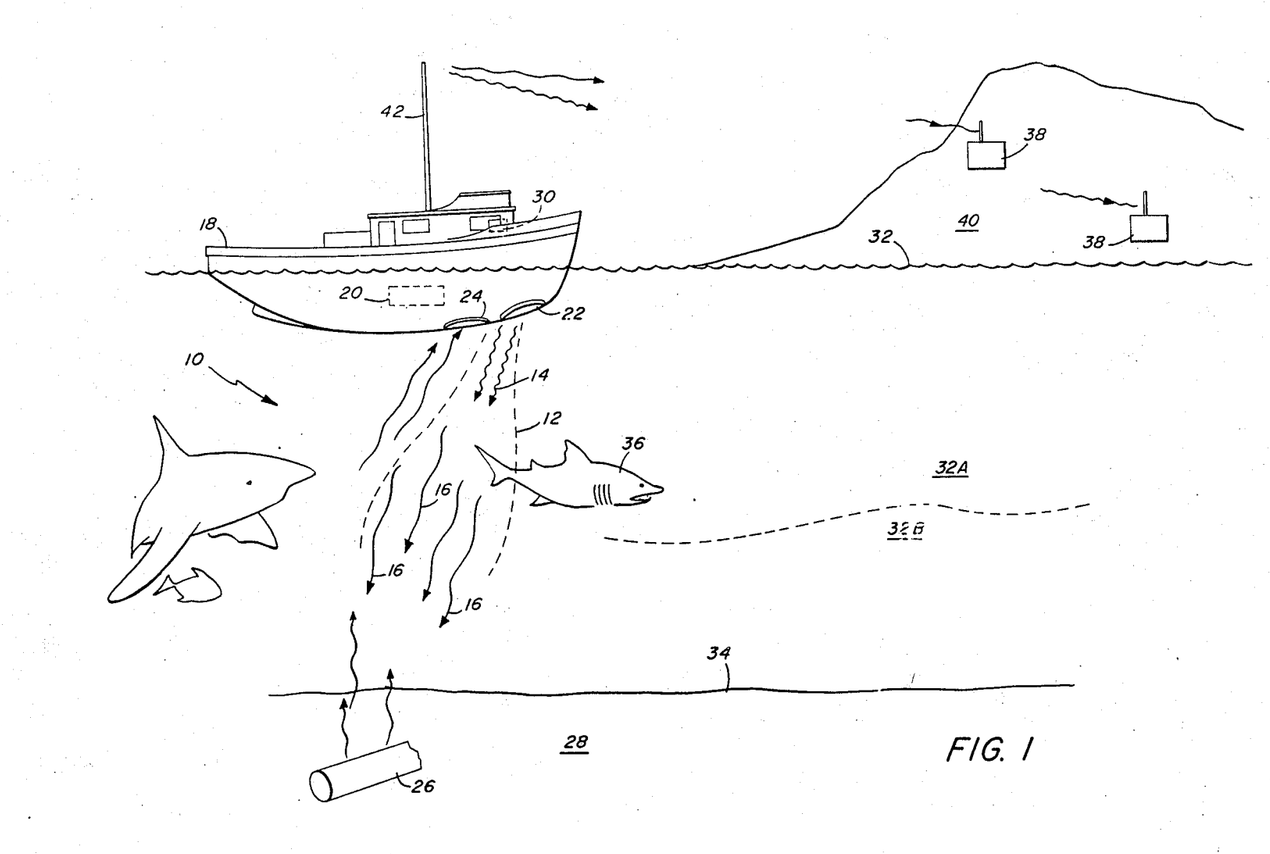
FIG. 1 is a stylized pictorial representation of a ship carrying the invention for gathering data of the ocean bottom.

Referring now to FIG. 1 there is shown a stylized pictorial representation of the communication system 10 utilizing a nonlinear medium 12, herein the ocean waters, for converting radiant energy at relatively high frequencies indicated by arrows 14 to radiant energy at a low frequency indicated by arrows 16. A ship 18 carries a signal generator 20 shown in dotted lines, a transmitting transducer 22 for transmitting high frequency energy into the nonlinear medium 12, and a receiving transducer 24 for receiving low frequency energy reflected from sub-bottom strata or object such as a pipe 26 submerged within the stratified ocean bottom 28. A display 30, partially seen through a window in the bridge of the ship 18, presents a visual recording of sonic signals reflected from the various layers of water 32A and 32B of the ocean 32, the interface 34 between the ocean 32 and the ocean bottom 28, marine life 36 and, more particularly, the pipe 26. The display can also show sub-bottom strata useful for locating geological surveying. The location of the ship 18 may be determined by well-known means such as an inertial navigator or, as seen in the Figure, by a plurality of stations 38 on the shore 40 which transmits and receives signals from the ship's antenna 42 to effect a triangulation procedure which continuously monitors the location of the ship 18. This location information is utilized in a well-known manner by the display 30 to provide a map of the ocean bottom 28 and to form a pictorial representation and the location of the pipe 26.

Figure 2:
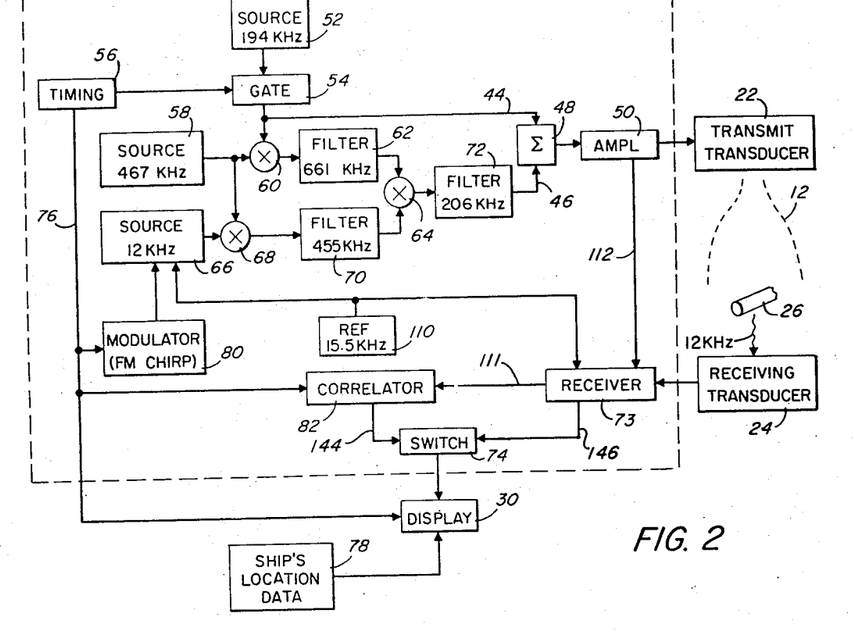
FIG. 2 is a block diagram of the invention.

Referring now to FIG. 2 there is shown a block diagram of the signal generator 20 and its interconnections with the transmitting transducer 22, the receiving transducer 24 and the display 30. The signal generator 20 provides electrical energy at two frequencies, shown by way of example as 194 KHz on line 44 and 206 KHz on line 46, which are then summed together by a summing circuit 48 and amplified by amplifier 50 to a power level suitable for conversion into sonic energies at these two frequencies by means of the transmitting transducer 22. The electrical energy on line 44 is provided by a signal source 52, a continuous wave (cw) sinusoidal generator at 194 KHz, via a gate 54 which is operated by a timing unit 56. The timing unit 56 periodically opens and closes the gate 54 to provide a pulsed cw signal on the line 44. The pulsed signal from the gate 54 and a second cw signal at 467 KHz from signal source 58 are combined in a multiplier 60, which may be a well-known bridge modulating circuit, to provide electrical energy at a plurality of frequencies, one of which, 661 KHz, is passed by a filter 62 to a similar multiplier 64. A third source, signal source 66, provides a cw signal at 12 KHz which is applied to a multiplier 68 similar to multiplier 60. Recalling that the transmitting transducer 22 transmits sonic energy at frequencies of 194 KHz and 206 KHz into the nonlinear medium 12, the interaction of these high frequency sonic signals in the nonlinear medium 12 produces a low frequency sonic signal of value 12 KHz which reflects off the pipe 26 to be received by the receiving transducer 24. Thus, it is seen that the frequency, 12 KHz, of the signal at the receiving transducer 24 is equal to the frequency of the signal source 66.

The signals of sources 58 and 66 are applied to the multiplier 68 which provides electrical energy at a plurality of frequencies one of which, 455 KHz, is passed by a filter 70 to a multiplier 64. The signals passed by filters 62 and 70 are similarly processed by the multiplier 64 and a filter 72 to provide the signal at 206 KHz on line 46. It is noticed that the signal on line 46 is continuously applied by the summing circuit 48 and the amplifier 50 to the transmitting transducer 22 while the signal on line 44 is pulsed. Accordingly, the low frequency signals at 12 KHz directed to the pipe 26 is a pulsed signal having the same pulse width as the signal on line 44.

The signals received from the receiving transducer 24 are applied by a receiver 73 (to be described hereinafter) and a switch 74 to the display 30. The display 30 is triggered in a well-known manner by signals on line 76 from the timing unit 56 so that the time delays experienced by signals propagating from the transmitting transducer 22 through the ocean 32 of FIG. 1 appear on the display 30 as the distances from the ship 18 to the interface 34 and the pipe 26. Successive passes of the ship 18 across the pipe 26 provide the aforementioned mapping of the ocean bottom by means of the ship's location data 78 (obtained by the triangulation or from an inertial navigator) and by the interconnection of the ship's location data 78 with the display 30.

It may also be desirable to modulate the low frequency sonic signal directed at the pipe 26. This is effected by modulator 80 which applies a voltage signal having a predetermined waveform to the signal source 66. Thus, for example, if the signal source 66 is a voltage tunable oscillator, the phase or frequency of the signal of source 66 may be phase or frequency modulated to provide, for example, an FM chirp signal which results in a similar FM chirp modulation being directed into the pipe 26. The filter 70 and 72 are provided in a well-known manner with sufficient bandwidth to pass the signal modulation. In this case, range data representing the distance of the pipe 26 from the ship 18 is obtained by correlating the signal at the receiving transducer 24 with a stored replica 84 of the modulated signal at correlator 82 as will be described hereinafter with reference to FIG. 3. The data is displayed by switching the switch 74 to pass data from the correlator 82 to the display 30.

Figure 3:
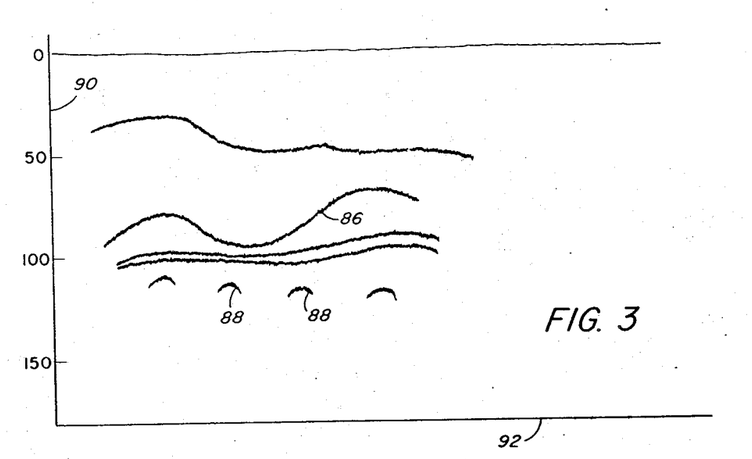
FIG. 3 is a typical display of an ocean bottom profile taken with a sonar system embodying the invention.

FIG. 3 shows a typical mapping of the ocean bottom showing an object submerged in the ocean bottom. Interfaces between the waters of the ocean, the first bottom and subbottom strata are indicated by numeral 86, and a submerged object is indicated by numeral 88. The ocean depth or distance from the ship 18 (of FIG. 1) to the submerged object 88 is indicated by the vertical axis 90, and the distance along the ocean bottom is indicated by the horizontal axis 92.

Figure 4:
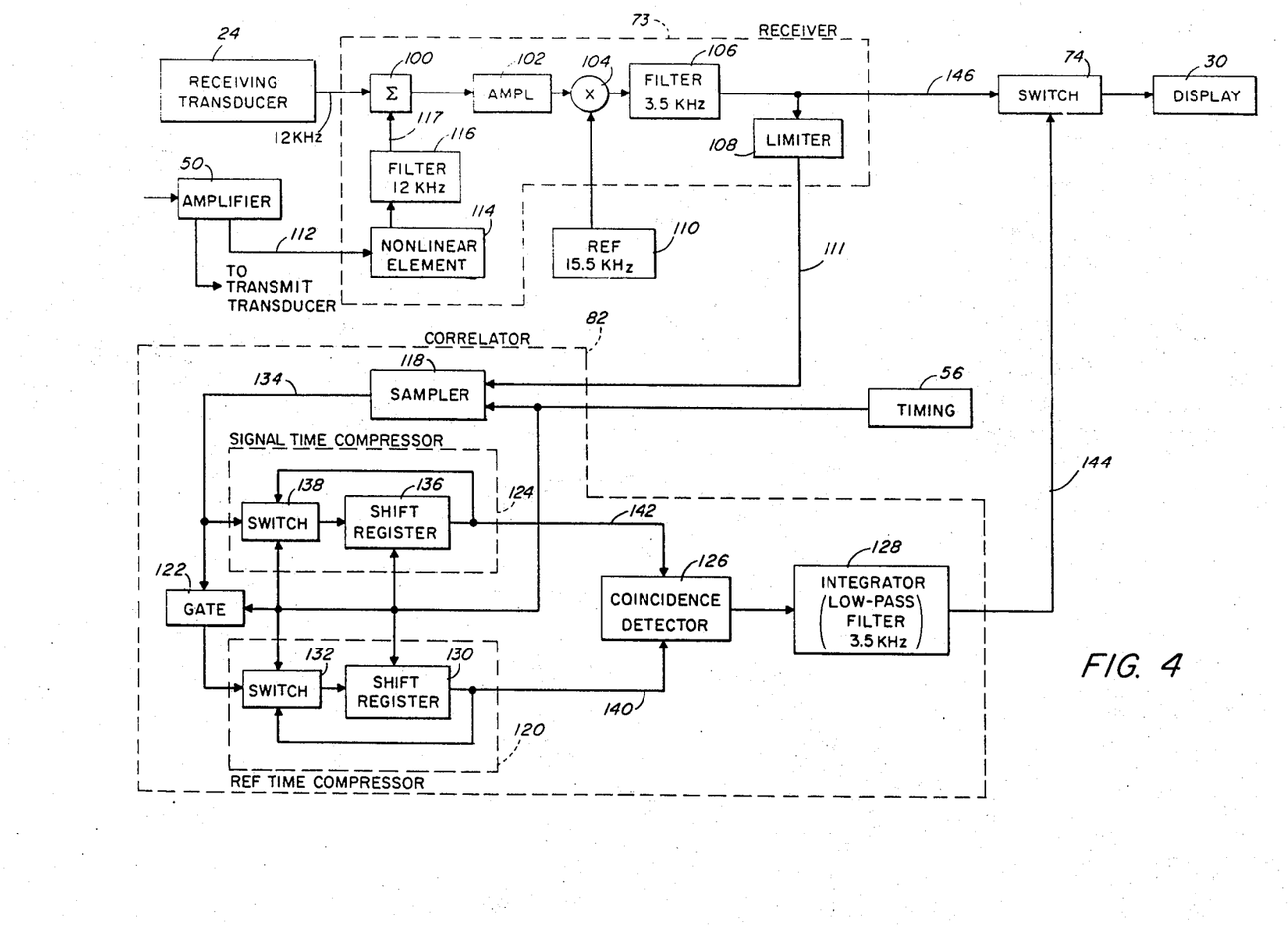
FIG. 4 is a detailed block diagram of a receiver and correlator utilized in the invention.

Referring now to FIG. 4 there is shown a detailed block diagram of the receiver 73 and the correlator 82 of FIG. 2 including their interconnections with other components of the system of FIG. 2. The receiver 73 comprises a summer 100, an amplifier 102, a multiplier 104, a filter 106 and a limiter 108. A signal from the receiving transducer 24 is passed via the summer 100 to the amplifier 102 which amplifies the signal to a suitable level for processing by the multiplier 104. The multiplier 104 is, for example, a well-known diode-bridge modulating circuit which combines a reference signal 110 having a frequency of 15.5 KHz with the 12 KHz signal provided by the amplifier 102 to produce a signal at 3.5 KHz. The filter 106 has a sufficiently wide pass band centered at 3.5 KHz to pass the signal, a pulsed, frequency-modulated sinusoid, to the limiter 108 which then provides a symmetrical clipping effect to the signal thereby transforming it into a signal on line 111 having a substantially trapazoidal or rectangular waveform.

The amplifier 50 seen in both FIGS. 2 and 4 which provides the high powered signal to the transmitting transducer 22 also has a second output on line 112 through which is coupled a low powered replica of the signal applied to the transmitting transducer 22. The signal on line 112 may be provided, by way of example, by extracting a portion of the output signal of the amplifier 50 through a large attenuator (not shown). The signal on line 112 will be utilized in a manner to be described for inserting a replica of the 12 KHz signal impinging on the pipe 26 of FIG. 2 into the correlator 82. Since the frequency of the low frequency signal impinging on the pipe 26 is equal to the difference of the two high frequencies of the signals applied to the transmitting transducer 22, the signals on line 112 are applied to a nonlinear element 114, such as a diode, which results in a low frequency signal at 12 KHz which is passed by filter 116, having a bandwidth at least as great as that of filter 106, along line 117 to the summer 100. Thus, prior to the reception of the echo from the pipe 26 by the receiving transducer 24, a 12 KHz replica obtained via the nonlinear element 114 is applied to the amplifier 102 with the result that the receiver 73 now provides initially a replica of the low frequency signal impinging upon the pipe 26 which is followed subsequently by an echo of the low frequency signal from the pipe 26.

Referring again to FIG. 2 the signal source 66 comprises a variable frequency oscillator centered at 3.5 KHz (not shown in the Figures) and a multiplier and filter similar to the multiplier 104 and filter 106 for translating the signal from the frequency of 3.5 KHz to a frequency of 12 KHz by mixing the 3.5 KHz signal with the reference signal 110 in a well-known manner. The signal frequency of 3.5 KHz is utilized since this corresponds to the system data rate of 3.5 KHz. It is also apparent that, with reference to FIG. 4, the 12 KHz replica provided by the filter 116 may be provided, alternatively in a more simple manner by connecting the output of the signal source 66 of FIG. 2 directly to the summer 100; however, the replica provided by the filter 116 is more advantageous in that it can be more readily made to closely approximate the low frequency signal actually impinging upon the pipe 26 of FIG. 2.

The correlator 82 may be of a standard form such as that described in U.S. Pat. No. 2,958,039 which issued to V.C. Anderson on Oct. 25, 1960 or in U.S. Pat. No. 3,488,635 which issued to T.P. Sifferlin on Jan. 6, 1970, or as shown in FIG. 4 comprises a sampler 118 which samples the signal provided by the limiter 108 at a relatively high sampling rate such as 20 KHz, a reference time compressor 120 which is made responsive to the replica signal on line 117 by means of a gate 122, a signal time compressor 124 responsive to all signals passed by the amplifier 102, a coincidence detector 126 for indicating the simultaneous presence of identical samples of compressed signals in the two time compressors 120 and 124, and an integrator 128 in the form of a low pass filter suitable for passing a 3.5 KHz signal for intergrating the output pulses of the coincidence detector 126 to provide an amplitude modulated sinusoidal waveform at 3.5 KHz in which the amplitude represents the degree of correlation between the replica and the echo signals. The reference time compressor 120 comprises a shift register 130 providing serial storage of 1,032 bits and a switch 132 for selectively applying an output signal of the shift register 130 or an input signal on line 134 provided by the sampler 118. The signal time compressor 124 similarly comprises a shift register 136 providing serially 1,031 bits of storage and a switch 138 for selectively applying to the shift register 136 either an output signal of the shift register 136 or an input signal on line 134.

Referring now to FIGS. 2 and 4, the pulse width of the low frequency signal impinging upon the pipe 26 has a value of, for example, 50 milliseconds as is provided by the gate 54 in accordance with signals from the timing unit 56. At the same time that the gate 54 is made conducting, the gate 122 is similarly made conducting by signals along line 76 from the timing unit 56 so that the replica signal on line 117 can pass via sampler 118 into the reference time compressor 120. The gates 54 and 122 are simultaneously rendered nonconducting by the timing unit 56 so that thereafter signals such as noise or echoes entering the receiving transducers 24 are excluded by the gate 122 from entering the reference time compressor 120.

The sampling rate, 20 KHz, the sampler 118 is sufficiently high relative to the pulse center frequency, 3.5 KHz, of the signal on line 111 such that several samples of the signal are extracted by the sampler 118 during a single period of the signal. Each of the samples are in the form of a narrow pulse having a width on the order of nanoseconds.

The two time compressors 120 and 124 operate in essentially the same manner so that only the operation of the signal time compressor 124 need be described. Each of the pulse samples on line 134 pass through switch 138 into the shift register 136. A pulse entering the input to the shift register 136 is then sequentially shifted along the shift register 136 in response to clock pulses on line 76 provided by the timing unit 56. The switch 138 is similarly operated by timing pulses from the timing unit 56. The sampler 118 provides a one bit sample at which a 1 represents a positive portion of the waveform on line 111 and a 0 represents a negative portion of the waveform on line 111. Thus there is provided a sequence of one bit digital numbers emanating from the sampler 118. Each one of these one bit samples is applied to the input of the shift register 136 and is then shifted down the shift register at a much higher rate than that at which these one bit signals appear on line 134. These one bit signals are shifted from stage to stage of the shift register 136 at a clock rate of approximately 20 MHz.

It is readily seen that for a signal on line 111 having a width of 50 milliseconds, the sampling rate of 20 KHz provides 1,000 samples of the signal. The width of the replica signal on line 117 and the sampling rate are adjusted so that there are a total of 1,032 samples obtained for each of the replica signals on line 117. Thus the shift register 130 is completely filled with the samples obtained by sampling the replica signal on line 117, while the shift register 136 having one less storage stage permits the first sample to overflow, thereby resulting in a precession of the data stored in the shift register 136 relative to the data stored in the shift register 130. The precession is aided by switch 138 which normally conducts samples from the output of the shift register 136 to its input, but momentarily switches to admit a sample on line 134 and thereby discards from storage a sample admitted 1,031 samples earlier. The time required for a sample to circulate one complete cycle through the shift register 136 or 130 is smaller than the intersample interval by an amount of time equal to approximately the width of one sample so that a new sample on line 134 can enter into the shift register 136 immediately after the preceding sample has recirculated through the switch 138 back into the shift register 136. At the sampling rate of approximately 20 KHz there is approximately 50 microseconds alotted per sample. For 1,032 samples, the sample pulse width on line 134 must be less than 50 nanoseconds, for example, in the range of 30 to 40 nanoseconds.

After the shift register 130 has been filled, binary data samples are applied on line 140 to the coincidence detector 126 at a 20 MHz rate. Similarly, the shift register 136 which has also initially been filled with the data from the replica signal on line 117 applies binary data samples on line 142 at a 20 MHz rate to the coincidence detector 126. Since the two shift registers 136 and 130 have been loaded with identical data at the identical time, the signals on lines 140 and 142 are in phase so that the coincidence detector 126 provides output binary signals at a 20 MHz rate to the integrator 128, each binary signal being a 1 when there is a coincidence or cophasal relationship between the data samples on line 140 and 142, and a 0 when the signals on line 140 and 142 are out of phase. Accordingly, it is apparent that, initially, as the shift registers 130 and 136 fill up, the coincidence detector 126 provides a sequence of 1's. Later, after the replica signal on line 117 is completed, noise and reverberations from the ocean 32 of FIG. 1 appear on the line 111 and are sampled by sampler 118 so that randomly occurring samples appear at the input to the signal time compressor 124. Due to the precession of the two time compressors 120 and 124 relative to each other and also due to the fact that the data stored within the signal time compressor 124 is slowly being replaced with random samples, coincidences between the signals on lines 140 and 142 occur in a random fashion so that the 0's and 1's appearing at the output of the coincidence detector 126 also begin to occur in a random fashion.

A low amplitude signal results at the output of the integrator 128 in response to randomly occurring input pulses to the integrator 128, while a relatively high amplitude signal results at the output of the integrator 128 in response to a sequence of 1's emanating from the coincidence detector 126. It is also apparent that one complete precession cycle occurs during a time interval equal to the width of a replica signal on line 117. Thus, a complete shifting of a received echo relative to the replica stored in the reference time compressor 120 is accomplished during a time interval equal to the duration of one such replica signal. Since all the data samples are one bit samples, the use of the coincidence detector 126 is fully equivalent to a multiplication of each sample by every other sample during a precession cycle and the integrator 128 provides the summation of these terms to provide a correlation fully equivalent to the well-known mathematical definition of correlation. The elapsed time occurring between the initial high correlation and a later high value of correlation occurring when an echo is received represents the depth of a submerged object. The signal on line 144 and the signal applied to the limiter 108 are similar in that each is a sinusoid at a frequency of 3.5KHz with an amplitude related to the strength of an echo obtained from the ocean bottom 28 or the pipe 26 of FIG. 1. These two signals differ in that the signal on line 144 has a very high signal-to-noise ratio as compared to the signal on line 146 (from filter 106) in those situations where the echo signal strength is weak compared to the noise environment.

The presence of the sinusoidal signal at a frequency of 3.5 KHz at the output of the integrator 128 can be explained as follows. Recalling that a full precession cycle occurs during the duration of a replica signal on line 117, the number of phase reversals between signals on line 140 and 142 is equal to the number of cycles of the signal on line 146 occurring during the duration of a replica signal on line 117. The number of cycles of phase reversal is equal to the frequency of the sinusoid times the pulse width, and the rate of occurrence of these phase reversals is accordingly the number of cycles divided by the pulse width which is simply the frequency of 3.5 KHz. Thus, even when there is perfect correlation there is still a periodic occurrence of groups of 1's and 0's occurring at the output of the coincidence detector 126 which results in the sinusoid having the frequency of 3.5 KHz appearing at the output of the integrator 128.

Figure 5:
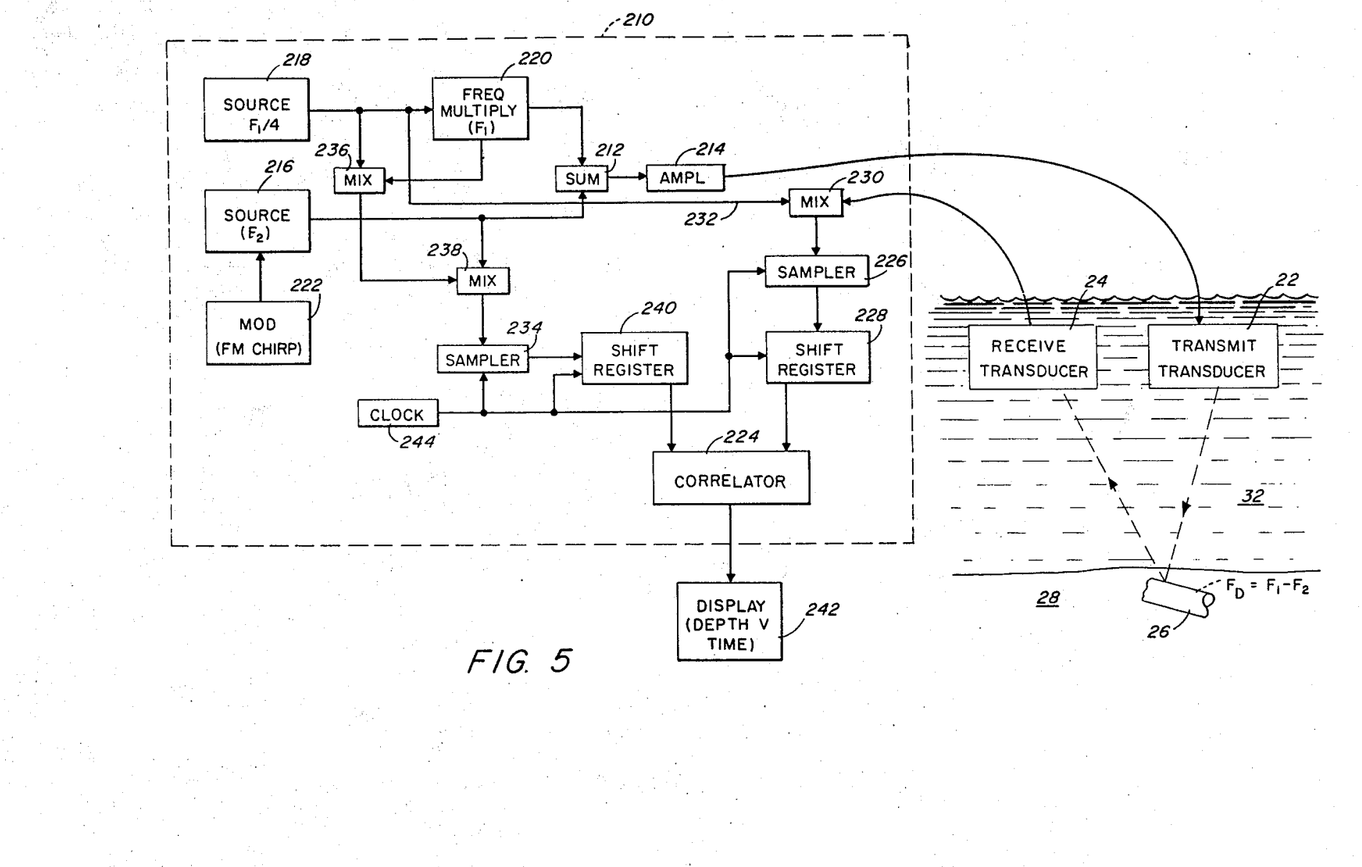
FIG. 5 is a block diagram of an alternative embodiment of the invention.

Referring now to FIG. 5 there is shown a block diagram of a signal generator 210 which represents an alternative embodiment of the signal generator 20 of FIGS. 1 and 2. The signal generator 210 utilizes two sinusoidal waveforms of frequencies $F_1$ and $F_2$ which are summed together by summer 212 and applied via amplifier 114 to the transmitting transducer 22. The sinusoidal cw signal at the frequency $F_2$ is provided by source 216, while the sinusoidal cw signal at the frequency $F_1$ is provided by a source 218 in combination with a well-known frequency multiplier 220. As shown, by way of example in FIG. 4, a source 218 provides a frequency $F_1/4$ and the frequency multiplier 220 has a multiplication factor of 4 which may be conveniently implemented by means of nonlinear diode network in which the fourth harmonic is obtained or, alternatively by means of a pair of serially connected frequency doubler circuits. The source 216 is modulated by modulation signals provided by modulator 222 to provide, for example, an FM chirp waveform centered about the frequency $F_1$. A difference frequency $F_D = F_1 - F_2$ formed by the interactions of the signals at frequencies $F_1$ and $F_2$ in the water of the ocean 32 reflects off the pipe 26 in the ocean bottom 28 and is received by the receiving transducer 24. Since the frequency modulation of the signal at $F_2$ is centered about the frequency $F_1$, it is apparent that the difference frequency $F_D$ momentarily passes through zero. It is thus seen that in a signal at the difference frequency $F_D$ the frequency varies from a maximum value to a value of zero and then returns to its maximum value while the phase of the signal undergoes a 180° phase shift as it passes through the zero frequency point. Thus, the bandwidth of the signal at the difference frequency is equal to substantially twice the average or center frequency, the term "substantially" being used, since at frequencies near zero the conversion efficiency of the water in converting $F_1$ and $F_2$ into $F_D$ is minimal so that in a practical system the energy content of signals at a near zero difference frequency is too low to be utilized.

To make maximum use of the energy content of the signal at the difference frequency, a correlator 224 correlates the signal received at transducer 24 with a reference or replica applied in the following manner. The signal received at transducer 24 is sampled in a one-bit sampler 226 which preserves information relative to the zero crossings of this signal and stores this data in a shift register 228. In order to facilitate the sampling at the lower frequencies, the signal from the receiving transducer 24 is first mixed in mixer 230 with a reference on line 232 of frequency value $F_1/4$ so that the signal entering the sampler 226 is centered about the frequency of $F_1/4$. In a similar way sampling by sampler 234 of a replica signal is provided by means of mixers 236 and 238 and a shift register 240. A mixer 236 coincides the signals at the frequencies $F_1/4$ and $F_1$ to provide a signal at a freuqency of $(¾)F_1$ which upon being mixed by mixer 238 with the signal source 216 provides the sampler 234 with a frequency modulated signal centered about a frequency of $F_1/4$. The samplers 226 and 234, shift registers 228 and 240, the correlator 224 and a display 242 are coordinated in a well-known manner by signals provided by a clock 244. The display 242 is similar to the display 30 of FIGS. 1 and 2 and provides a graphical presentation of the ocean bottom 28 and the pipe 26 as a function of the time or distance traveled by the ship 18 of FIG. 1.

It is interesting to note that with respect to both the embodiment of FIG. 2 and of FIG. 5 the reception of a signal at a frequency lower than that of the transmitted frequencies provides for a broader directivity pattern of received sonic energy than of the transmitted sonic energy, assuming that the transmitting and receiving transducers 22 and 24 of FIG. 1 are of equal size. This is advantageous particularly in the situation where the ship 18, while transporting the two transducers 22 and 24, experiences a pitching and/or rolling motion induced by waves of the ocean 32. The relatively broad directivity pattern of the receiving transducer 24 facilitates reception of echoes, such as echoes from the pipe 26, when a rolling of the ship 18 momentarily alters the orientation of the transducers 22 and 24 after a transmission of sonic energy towards the pipe 26.

Also, with reference to both the embodiment of FIG. 2 and of FIG. 5, the use of the frequency modulation may provide information relative to the ocean bottom 28 of FIG. 1 and pipe 26 which may not be as readily obtained with received sonic energy having a constant frequency. As is well known, such modulation can provide a signature to received echoes which may aid in identifying a reflecting object.

It is understood that the above-described embodiments of the invention are illustrative only and that modifications thereof will occur to those skilled in the art. Accordingly, it is desired that this invention is not to be limited to the embodiments disclosed herein but is to be limited only as defined by the appended claims.

What is claimed is:

1. In combination:

means for transmitting signals at a plurality of frequencies into a media providing a nonlinear interaction between a signal transmitted at a first frequency and a signal transmitted at a second frequency to provide a beam of radiant energy propagating a signal at a frequency equal to the difference between one frequency of said plurality of frequencies and a second frequency of said plurality of frequencies, having a common radiating aperture for the transmission of said signals at said plurality of frequencies;

means coupled to said transmitting means for providing a reference having a frequency equal to said difference frequency; and means responsive to said energy for correlating said signal at said difference frequency with said reference.

2. The combination according to claim 1 wherein said correlating means comprises:

means for providing said reference;

means for storing said reference in a first recirculating delay means;

means for storing said difference frequency signal in a second recirculating delay means such that said stored difference frequency signal processes relative to said stored reference; and means responsive to said stored reference and said stored difference frequency signal for providing a time of arrival of said difference frequency signal at its storage means.

3. The combination according to claim 1 wherein said correlating means comprises:

means for sampling said reference and said difference frequency signal to provide a series of samples of said reference and said difference frequency signal;

means for signaling the coincidence of a sample of one of said series with individual samples of the other of said series; and means for combining said coincidence signals to indicate a correlation of said reference and said difference frequency signal.

4. The combination of claim 1 further comprising means for displaying the times of arrival at said correlating means of energy at said difference frequency to show the points of reflection in a media through which said energy at said difference frequency propagates.

5. The combination of claim 4 wherein said transmitting means comprises means for modulating an input signal to generate one of said transmitted signals.

6. A sonic communication system comprising:

means for transmitting and means for receiving sonic energy signals transmitted into a nonlinear medium, said transmitting means providing sonic energy at a first frequency and at a second frequency, said receiving means being responsive to energy at a frequency equal to the difference of said first frequency and said second frequency;

a source of signal having a frequency equal to said difference frequency; and means for combining said signal at said difference frequency with a signal at higher frequencies to provide signals for transmission by said transmitting means.

7. A sonic communication system comprising:

means for transmitting and means for receiving sonic energy signals transmitted into a nonlinear medium, said transmitting means providing sonic energy at a first frequency and at a second frequency, said receiving means being responsive to energy at a frequency equal to the difference of said first frequency and said second frequency;

a source of signal having a frequency equal to said difference frequency;

means for combining said signal at said difference frequency with a signal at a higher frequency to provide a sonic energy signal for transmission by said transmitting means;

means for modulating said signal at said difference frequency; and means for displaying the locations of reflections of said energy at said difference frequency from points of reflection in a medium through which said energy at said difference frequency propagates.

8. The system according to claim 7 wherein said displaying means comprises:

means for storing said signal of said source in a first recirculating delay means;

means coupled to said receiving means for storing a received signal in a second recirculating delay means such that said received signal processes relative to said stored signal of said source; and means responsive to said stored received signal and said stored signal of said source for providing a time of reception of said received signal.

9. A signal source propagating a radiant energy signal through a medium remote from said signal source, said signal having a spectral bandwidth equal to substantially twice the center frequency of said bandwidth, said source including a common radiator of radiant energy at two frequencies, a frequency of said signal being equal to an arithmetic combination of said two frequencies.

10. In combination:

means for transmitting signals at a plurality of frequencies into an extended medium having a nonlinear propagation characteristic and which converts at least a portion of said signals into a signal having at least one frequency which is different than said transmitted frequencies, said transmitting means including a common radiating aperture for radiation of said signals at said plurality of frequencies;

means coupled to said transmitting means for generating a reference having said one frequency;

means coupled to said medium for receiving said different frequency signal; and means for comparing a reference to said different frequency signal.

11. The combination of claim 10 wherein said transmitting means includes means for modulating said signals.

12. The combination according to claim 10 wherein said comparing means comprises:

means for sampling said reference and said different frequency signal to provide a series of samples of said reference and said different frequency signal;

means for signaling the coincidence of a sample of one of said series with individual samples of the other of said series; and means for combining said coincidence signals to indicate a correlation of said reference and said different frequency signal.

13. The combination according to claim 10 wherein said comparing means comprises:
means for providing said reference, said reference having a frequency equal to said different frequency;
means for storing said reference in a first recirculating delay means;
means for storing said different frequency signal in a second recirculating delay means such that said stored different frequency signal processes relative to said stored reference; and
means responsive to said stored reference and said stored different frequency signal for providing a time of reception of said different frequency signal.

14. A system for communicating with a submerged reflector comprising in combination:
means for propagating first signals through a first medium having a nonlinear propagation characteristic for converting said first signals into at least one other signal; and
means for reflecting signals, said reflecting means being located within a second medium coupled to said first medium and having a relatively large transmissivity of said other signal and a relatively low transmissivity of said first signals to enable said reflecting means to selectively reflect said other signal while inhibiting the reflection of said first signals.

15. The combination according to claim 14 further comprising:
means for providing a series of samples of a reference;
means for sampling said other signal to provide a series of samples of said other signal;
means for signaling the coincidence of a sample of one of said series with individual samples of the other of said series; and
means for combining said coincidence signals to indicate a correlation of said reference and said other signal.

16. In combination:
means for transmitting at least one directive beam of radiant energy having a plurality of frequencies into a medium having a nonlinear characteristic which converts at least a portion of such radiant energy into radiant energy at a frequency lower than the frequencies of said plurality of frequencies, said transmitting means having a common radiating aperture for the radiation of said radiant energy at said plurality of frequencies;
means for transporting said transmitting means through said medium sequentially illuminate portions of said medium;
means located at a distance from said transmitting means for providing data relative to the location of said transmitting means; and
means coupled to said medium for receiving at least a portion of said lower frequency radiant energy, said receiving means having a directivity pattern which is broader at said lower frequency than the directivity pattern of said transmitting means at said transmitted frequencies.

17. The combination of claim 16 wherein a portion of said lower frequency radiant energy is reflected to said receiving means.

18. The combination of claim 17 wherein said receiving means is also transported by said transporting means, said broader directivity pattern of said receiving means permitting reception of radiant energy as said transmitting beam is moved during said transportation.

19. In combination:
means for transmitting energy at a plurality of frequencies into a first and a second medium, said first medium having a nonlinear charactistic which converts said energy into energy at a frequency derived from a combination of frequencies of said plurality of frequencies, said second medium containing a reflector of said derived frequency energy to permit an echo of said derived frequency energy to emanate from said reflector, said transmitting means having a common radiating aperture for the radiation of said energy at said plurality of frequencies;
means located at a distance from said transmitting means for generating signals having data relative to the location of said transmitting means; and
means responsive to said echo and coupled to said data signal generating means for indicating the location of said reflector.

20. The combination of claim 19 wherein said indicating means comprises:
means for receiving said echo, said receiving means having a predetermined position relative to said transmitting means; and
means for measuring the time of reception of said echo at said receiving means relative to the time of transmission of said energy at said plurality of frequencies.

21. The combination of claim 19 further comprising:
means for transporting said transmitting means; and
means for indicating the location of said transmitting means relative to a known point to provide a map of said media.

22. The combination according to claim 19 wherein said location indicating means comprises:
means for providing a series of samples of a reference;
means for sampling said echo to provide a series of samples of said echo;
means for signaling the coincidence of a sample of one of said series with individual samples of the other of said series; and
means for combining said coincidence signals to indicate the distance between said reflector and said transmitting means.

23. A submerged reflector identification system comprising in combination:
means for transmitting signals at a plurality of frequencies into a medium having a reflector therein for reflecting energy of said signals, said medium having a nonlinear characteristic for converting said signals into at least one other signal having a frequency derived from a combination of frequencies of said plurality of frequencies, said transmitting means having a common radiating aperture for radiation of said signals at said plurality of frequencies;

means for receiving signals at said derived frequency reflected from said reflector;

means connecting with said transmitting means for providing a modulation of said derived frequency for identification of said reflector; and means coupled to said receiving means and to said modulation means for comparing a modulation of said received signals with said transmitted modulation.

24. The combination of claim 23 further comprising means connecting with said receiving means for displaying said received signals at said derived frequency.

25. The combination of claim 24 wherein said receiving means comprises means for comparing a replica of said modulation with said received signals at said derived frequency.

26. In combination:

means for transmitting energy at a first frequency and at a second frequency into a medium which converts said energy into a first signal at a frequency equal to the difference of said first frequency and said second frequency;

means for providing a second signal at said difference frequency;

means for storing said first signal in a first recirculating delay means;

means for storing said second signal in a second recirculating delay means such that said stored second signal precesses relative to said stored first signal; and means responsive to said stored first signal and said stored second signal for providing the time of arrival of said first signal at said first signal storage means.

* * * * *

UNITED STATES PATENT OFFICE
CERTIFICATE OF CORRECTION

Patent No. 3,786,405                    Dated January 15, 1974

Inventor(s) Mark A. Chramiec and William L. Konrad

It is certified that error appears in the above-identified patent and that said Letters Patent are hereby corrected as shown below:

In the Claims

Claim 2, column 9, line 30, change "processes" to -- precesses --.

Claim 8, column 10, line 29, change "processes" to -- precesses --.

Claim 13, column 11, line 13, change "processes" to -- precesses --.

Signed and sealed this 24th day of June 1975.

(SEAL)
Attest:

RUTH C. MASON
Attesting Officer

C. MARSHALL DANN
Commissioner of Patents
and Trademarks